3,403,081
BIO-CHEMICAL SENSOR AND METHOD OF USING SAME
Gilson H. Rohrback, Whittier, and Willard R. Scott, Jr., Fullerton, Calif., assignors to TRW Inc., a corporation of Ohio
Continuation of application Ser. No. 136,370, Sept. 6, 1961. This application Feb. 6, 1967, Ser. No. 614,358
8 Claims. (Cl. 204—1)

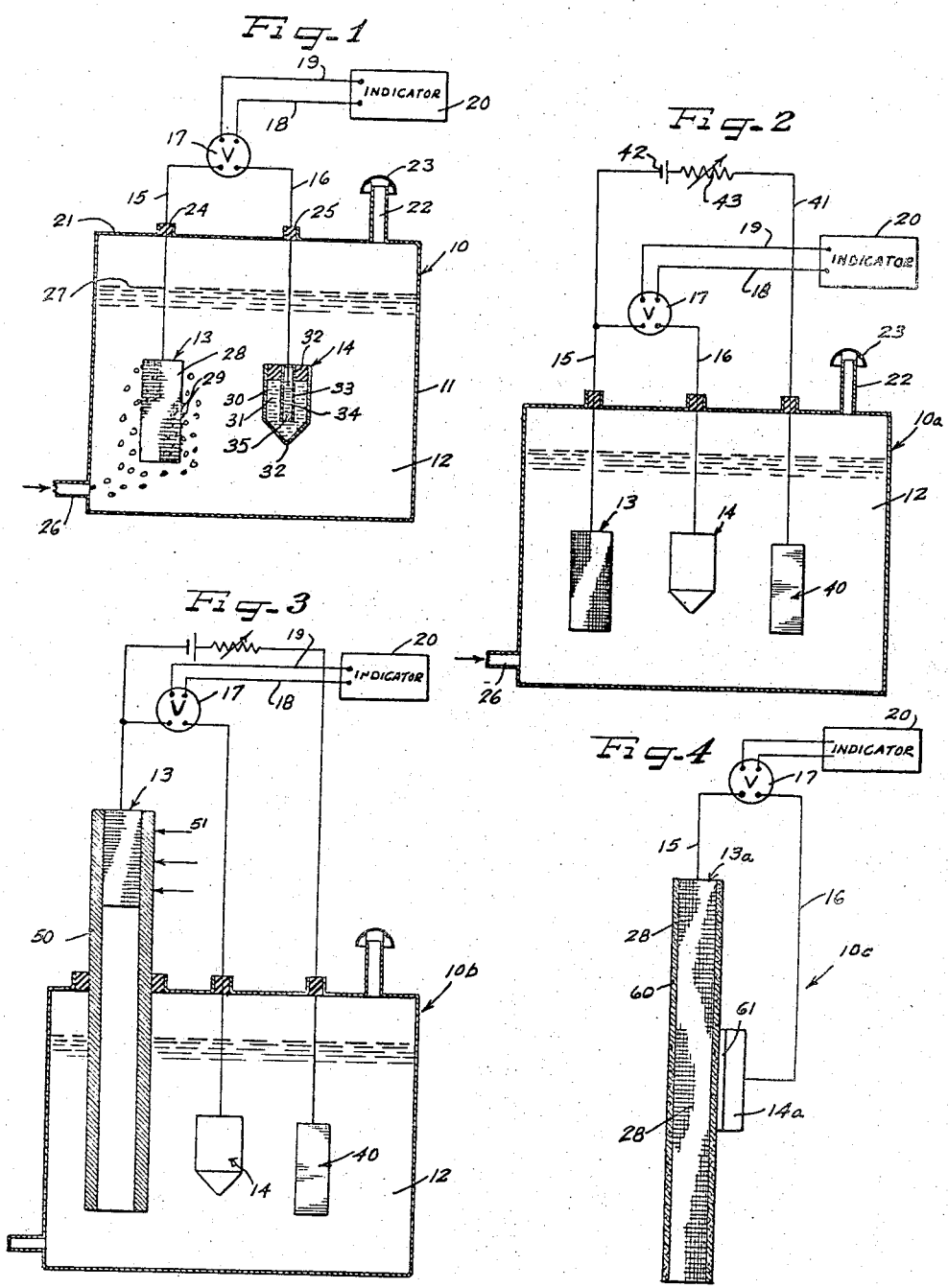

ABSTRACT OF THE DISCLOSURE

This invention relates to a bio-sensor device comprising a reference electrode, such as a Calomel electrode, and a non-consumable electrode infected with microorganisms or enzymes immersed in an electrolyte. When a contaminant is passed through the electrolyte the microorganisms or enzymes are rendered inactive thereby producing a change in the electric potential relative to the reference electrode.

---

This invention is a continuation of application Ser. No. 136,370, filed Sept. 6, 1961 now abandoned.

The metabolic activity of biological organisms and the catalytic activity of enzymes are effective to catalyze or promote half cell reactions in electrochemical generation of current. In such current generation two distinct electrode processes occur including the anodic process in which a substance is oxidized and gives up electrons to an electrode and a cathodic process in which electrons are consumed by a substance which is reduced. These half cell reactions are catalyzed or promoted when the microbiological organisms or enzymes are placed in intimate contact with an electrode and act as electron transfer agents from the electrode to the reactant of the half cell reaction.

It is believed that the potential modifying characteristics referred to herein are primarily due to the action of the enzymes contained in the organisms. It is not necessary however, in most cases, to separate the enzymes from the remainder of the organic matters constituting the organism, as the organism itself serves as a convenient means for bringing the enzymes to the reaction sites at the electrode.

According to this invention, biological organisms or enzymes are placed in contact with an electrode where they serve to regulate on electric potential difference relative to a reference electrode. The organisms or enzymes are then exposed to materials which may contain poisons or other substances which affect the activity of the organisms or denaturing the enzymes thus changing their potential modifying activity so that the relative potential between the bioelectrode and the reference electrode is changed in a measurable sense. The change can be reflected by actuation of an indicator.

The devices of this invention are especially useful in detecting trace elements and poisons in liquid or gaseous media and thus give advance warning of contamination in the atmosphere or in any system. According to this invention it is possible to select enzymes or microorganisms which are closely related to maintenance of human metabolic processes for detecting systemic poisons before they build up in the atmosphere to a concentration sufficient to cause metabolic changes in the human body.

The devices of this invention are thus useful as poison gas detectors, contaminant detectors, ultraviolet and heat detectors, oxidizing agent and heavy metal ion detectors, and sensors for indicating changes in any system which have an effect on biological life processes.

The sensors of the present invention may use either living biological organisms, enzymes, or cell free extracts of organisms, depending on the particular system in which the sensors are to be employed. The enzymes employed may be derived from living organisms but they need not be, since it is possible to use synthetically prepared enzymes as well.

Fundamentally, the organisms or enzymes employed should have the property of promoting electrochemical actions on electrodes. This promoting activity may take two forms: (1) they may cause chemical reactions at the surface of the electrode or (2) they may promote chemical reactions to produce products which in turn promote depolarization reactions at the electrode. For example, those classes of enzymes known as oxidases, deoxidases, hydrogenases, and dehydrogenases are acted upon by the material being sensed to modify directly the polarization at the electrode. As an example of the second type of promoting activity, certain enzymes have the ability to deesterify compounds to leave a free acid, and the liberated acid then serves to depolarize the electrode.

The term "biological organism" as broadly used herein includes any organism produced by growth processes which function with a compatible electrolyte to catalyze or promote an electrode half cell reaction. Preferred "biological organisms" are of microscopic size and will hereinafter be referred to as microbiological organisms. Such microorganisms are preferred because they can be intimately colonized on an electrode.

The term "enzyme" as used herein means any organic substance catalyzing chemical transformations of material in biological organisms and includes both naturally and synthetically produced organic substance, which functions with a compatible electrolyte to catalyze an electrode half cell reaction.

A sensor according to this invention includes a bioelectrode composed of a relatively non-consumable electrode material such as nickel, platinum and carbon and in some cases iron or steel, on which is built up a colony of biological organisms or enzymes effective to promote or catalyze half cell reactions, an electrolyte or ion conducting substance compatible with the organisms or enzymes, such as brine composed of water, salt, and nutrients for the organisms, and a reference electrode or cell immersed in contact with the electrolyte and in electrically coupled relation with the bio-electrode to provide a measurable reference potential relative to the bioelectrode. The reference cell may be any well known unit effective to yield a constant half cell voltage such as, for example, a Calomel electrode, a silver-silver chloride electrode, or the like. The material to be sensed or detected is flowed in intimate contact with the bio-electrode and when the poison or contaminant therein has a sufficient concentration to change the electrochemical activity of the organisms, as by killing or rendering the same inactive thus resulting in an altered potential relative to the standard reference cell, an indication can be made either visual or audible, by any suitable known indicating device sensitive to the potential between the bioelectrode and the standard cell.

The sensors of the present invention may employ various species of bacteria or enzymes having the desired sensitivity toward the chemical or physical agent to be detected. By way of example, oxidizing agents can be detected by the use of a bioelectrode containing anaerobic bacteria such as *Desulfovibrio desulfuricanes* or clostridium. Light sensitivity can be provided by providing a bioelectrode with photosensitive organisms, such as the blue-green algae, *Chlorella pyrenoidosa* and *Fontinalis antipyretica*.

It is then an object of this invention to provide a sensor or dectector utilizing changes in the activity of biological organisms or enzymes for creating a measurable change in electrical potential whenever their activity is affected by surrounding ambient conditions.

Another object of this invention is to provide a potential sensor or detector embodying a bio-electrode sensitive to selected changes in ambient conditions for creating a measurable potential change.

Another object of this invention is to provide a potential sensor or detector composed of a bio-electrode, a reference electrode, a common electrolyte, and a potential indicator coupled to the electrodes.

A specific object of this invention is to provide a sensing device effective to maintain a measurable degree of polarization at all times and including a bio-electrode, a reference electrode, an ancillary electrode, an electrical input source coupled to the bio-electrode, and the ancillary electrode, and a potential indicator coupled to the bio-electrode and the reference electrode.

Another specific object of this invention is to provide a sensing device especially suited for rapid response to changes in a gas stream including a bio-electrode in the gas stream receiving electrolyte through a wick and coupled with a standard reference cell through a potential indicator and with an ancillary electrode through a current source.

A still further and specific object of this invention is to provide a bio-electrode having a colony of bacteria or enzymes sensitive to poisons or contaminants in a system maintained in a brine impregnated gelling agent which is also contacted by a reference electrode in coupled relation therewith for providing a measurage potential indication.

Other and further objects of this invention will be apparent to those skilled in this art from the following detailed description of the annexed sheet of drawings which, by way of preferred examples only, illustrates several embodiments of this invention.

FIGURE 1 is a schematic diagram of a basic two-electrode sensor or detector according to this invention;

FIGURE 2 is a schematic diagram of an improved three-electrode detector or sensor according to this invention;

FIGURE 3 is a schematic diagram of a three-electrode detector or sensor according to this invention especially adapted for rapid response in a gas stream; and FIGURE 4 is a schematic diagram of a sensor or detector according to this invention utilizing a bio-electrode without the necessity for a liquid electrolyte contaminating the cell.

As shown on the drawings:

In FIGURE 1 a reference numeral 10 designates generally a gas analysis device using two electrodes according to this invention. The device 10 includes a container 11 with liquid electrolyte 12 therein in which is immersed a bio-electrode 13 and a standard Calomel reference cell electrode 14 coupled by conductors 15 and 16 with a voltage sensitive device such as a volt meter 17. The volt meter in turn may be coupled through conductors 18 and 19 with an indicator 20 such as an alarm device, visual signalling device or the like electrically energized signal unit activated by or through the volt meter 17 to provide additional means for indicating the existence of a predetermined level of contamination. The container 11 preferably has a lid 21 vented at 22 through a non-spill cap 23 and the conductors 15 and 16 extend through the lid through sealing plugs 24 and 25 respectively. The container has a gas inlet 26 below the level 27 of the electrolyte 12 and gases to be analyzed or checked are flowed through the inlet 26 to bubble through the electrolyte 12 and escape through the capped vent 22.

The electrolyte 12 is any suitable aqueous ion conducting brine that is compatible with the biological organisms or the enzymes on the bio-electrode 13. A preferred specific electrolyte is a sodium chloride aqueous solution containing from one-half to five percent by weight of sodium chloride and having buffering agents sufficient to provide a pH of from five to nine.

The bio-electrode 13 may be composed of a non-consumable or relatively inert wire gauze cylinder 28 having woven wires of nickel, platinum, stainless steel and the like on which is deposited a colony of micro-biological organisms 29 effective to modify an electrical potential relative to the reference electrode 14 either directly or indirectly as a result of their metabolic or catalytic activity. These microbiological organisms or enzymes are selected with reference to the poisons or contaminants in the gas introduced through the inlet 26 to be detected by the device.

As a still further alternative the bacteria or enzymes 29 need not be directly built up on the electrode 28 but can be introduced into the electrolyte in close association with the electrode 28. For this purpose the active substance may be dissolved or dispersed in the electrolyte as a whole, or a drop feed device of a culture of the bacteria or of chemical enzymes can be carried by the lid 21 and fed to the electrolyte.

In one arrangement a bio-electrode with a colony of *Disulfovibrio desulfuricans* bacteria built up thereon was produced from a sterile strip of mild steel (S.A.E. 1020) about one inch in width, six inches in length and an eighth inch in thickness. One gallon of ordinary sea water having a pH of about eight, a chlorine content of about 19 parts per thousand, a combined oxygen content of about 1.7 parts per thousand, a magnesium content of 1.3 parts per thousand, a sulfur content of about 0.9 part per thousand, a calcium content of about 0.5 part per thousand, a potassium content of about 0.4 part per thousand and traces of bromine, carbon, strontium and boron was admixed in 500 parts per million of a nutrient mixture for sulfate reducing bacteria composed of 4 ml. of sodium lactate, 1 gram of yeast extract, 0.1 gram of ascorbic acid, 0.2 gram of magnesium sulfate, 0.01 gram of potassium hydrogen-phosphate, and 0.1 gram of ferrous ammonium sulfate was provided to assure sufficient nutrient for supporting growth of the bacteria. A live culture of the *Disulfovibrio desulfuricans* bacteria was then added to the resulting solution, the steel strip immersed therein and the assembly was covered with a lid to seal off the air and held at about 90° F. for two weeks. $H_2S$ formed during the bacterial growth was controlled by the addition of additional amounts of ferrous ammonium sulfate and at the end of the two week period the electrode was amply coated with a colony of the bacteria and was ready for use.

To maintain the growth and strength of the bacteria in the electrolyte 12, sodium sulfate is added from time to time to supply sulfate ions for replenishing the loss of such ions from the bacteria and nutrient such as described above in connection with the growth of the bacteria colony is also added. The sodium sulfate additions are made in the amount of about 5 grams per liter per week. The nutrient additions are made in the amounts of about 50 grams per liter per week.

The Calomel reference cell or electrode 14 is composed of a glass container 30 filled with an aqueous potassium chloride solution 31 that is saturated with mercurous chloride (Calomel). The top of the container is closed by an insulation plug 32 through which the conductor 16 passes into a glass tube 33 depending from the plug and filled with mercury 34. The bottom of the tube 33 is plugged with a porous plug 35 to maintain the mercury in the tube while accommodating flow of the potassium chloride Calomel solution into contact with the mercury. It should be understood that the thus described electrode 14 is a standard Calomel reference electrode commercially available from suppliers such as Beckmann Instrument Company and the details of the construction of such an electrode are not of consequence to this invention since other reference electrodes such as silver-silver chloride units are also operative.

In the illustrated arrangement of FIGURE 1, the bio-electrode 13 has a cathodic function and the biological organisms 29 thereon will exhibit a measurable potential difference relative to the reference electrode cell 14. A volt meter 17 coupled to the electrodes 13 and 14 will indicate this potential difference and the remote indicator 20 coupled with the volt meter can be used to give a signal whenever the contaminants in the gas stream flowing past the electrode 13 change the activity of the bacteria 29. When the bacteria are killed by the contaminants or poison it is necessary to introduce a new or replacement bio-electrode 13. Actually, it is not necessary for the contaminant to kill the bacteria, as deactivation of the bacteria short of a lethal effect can be detected in this manner.

As an example, using the sulfate reducer system specifically described previously and a Calomel reference, the normal potential difference using an iron electrode was in the range from 0.5 to 0.6 volt. When the bacteria had been killed by an oxidizing contaminant the potential difference changed to 0.7 to 0.8 volt.

A particularly effective detector for nerve gases is obtainable by building up the bio-electrode 13 with Cholinesterase enzyme. For this purpose the enzyme in the amount of about 100 parts per million in a dilute saline solution of a pH of about 7.5 having a sodium chloride content of about 3½% is admixed with about 1.5% agar. The electrode 28 is immersed in the mixture, the agar allowed to solidify on the electrode and the electrode then immersed in the electrolyte in the same manner as described in connection with FIGURE 1.

Nerve gas usually contains Esserine, which is a polycyclic nitrogen containing compound effective to block the nervous system and the Cholinesterase enzyme is effective to detect the presence of Esserine in amounts as low as 0.1 part per million.

Another suitable enzyme for detecting mustard gas, Lewisite and the like poisonous gases, is alcohol dehydrogenase in amounts of 100 parts per million in the electrolyte 12 and in admixture with from 10 to 25% by weight of diphospho nucleotide and alcohol.

Another enzyme inhibited by respiratory poisons can be selected from standard text references and it is within the scope of this invention to use the changes in potential of such enzymes by the poisons or contaminants for detecting the presence of the contaminants or poisons.

FIGURE 2 illustrates a form of sensor employing many of the features of the basic device of FIGURE 1 but in a highly improved version.

In the arrangement of FIGURE 2, the detector 10a is similar to the detector 10 of FIGURE 1 and common parts have been identified with the same reference numerals. The detector 10a, however, has an added nonconsumable ancillary electrode 40 preferably composed of a noble metal such as platinum, gold or a relatively inert material such as stainless steel. This ancillary electrode is connected through a conductor 15 to the bio-electrode 13. A variable resistance 43 is included in the battery circuit between the electrodes 13 and 40 and a degree of polarization is maintained at all times to give a very stable potential between the electrodes 13 and 40 and thus between the electrode 13 and its standard reference cell 14. A larger potential output to the volt meter 17 is thereby maintained to give a more reproducible signal to the indicator 20.

All of the other parameters and modifications of FIGURE 1 can be incorporated in FIGURE 2 and it should be understood that the detector 10a of FIGURE 2 embraces all the embodiments of FIGURE 1 plus the addition of the third electrode and the electrical energy source 42 to maintain a more stable potential. In the illustrated arrangement the electrode 13 acts as a cathode. When the bio-electrode 13 is used as an anode in those species where the biological organisms promote anodic half cell reactions, the polarity of the battery 42 is reversed.

As an example of the operation of the sensor shown in FIGURE 2, a bio-electrode was provided with a colony of *Desulfovibrio desulfuricans*. The polarizing current was adjusted until the potential difference between the Calomel and iron electrodes was 0.8 volt. This resulted in a current density of 0.1 to 0.5 ma./sq. cm. Upon killing of the bacteria, the potential difference rose to 1.2 volts at the same current density.

In the detector 10b of FIGURE 3 parts identical with parts described in FIGURES 1 and 2 have been marked with the same reference numerals and function in the same manner. In the detector 10b, however, the bio-electrode 13 is remote from the electrolyte bath 12 and is surrounded by a wick 50 dipped in the electrolyte bath 12 and conducting the electrolyte by wick action to the bio-electrode. In this arrangement the wick and wick encased bio-electrode 13 is interposed in a gas stream 51 to give a very rapid response to contamination or poisons in the gas stream as described above. The wick 50 can be composed of any suitable capillary material or cotton wick fabric or the like.

In the detector 10c of FIGURE 4 a modified bio-electrode 13a is provided in coupled circuit relation through a volt meter with a special reference electrode 14a. The electrode 13a instead of being immersed in a bath of liquid electrolyte 12 has the bacteria enzyme colony trapped in an agar cover 60 surrounding an inert metal central part 28 of the electrode. This agar cover 60 contains the electrolyte brine the same as the electrolyte 12 and the enzyme or bacteria colony is described in connection with FIGURE 1 but all cemented together on the electrode 28 by the agar.

The reference electrode 14a can be the same as the electrode 14 but equipped with a porous end face 61 in intimate contact with the agar coating 60 to contact the potassium chloride saturated with mercurous chloride solution with the electrolyte in the agar. The arrangement of FIGURE 4 is in the nature of a probe setup adapted for one time use and is much more portable than the embodiment requiring a container for liquid electrolyte.

From the above description it should be understood that this invention now provides extremely sensitive detectors for contaminants, poisons, and trace ingredients in surrounding atmospheres. While the devices are primarily useful in gas systems, it should be understood that the detectors are also sensitive to contaminants or poisons in liquid systems.

We claim:

1. A condition sensing device comprising container means for holding an electrolyte, a reference electrode, a bio-electrode in said container means, an electrode in said container means, an electrical current generator in circuit relation with said electrode and said bio-electrode, an electrical potential indicator in circuit relation with said reference electrode and said bio-electrode, and means exposing said bio-electrode to the action of conditions to be sensed, said bio-electrode including an electrical conductor base and a material selected from the group consisting of biological organisms and enzymes thereon effective to maintain a measurable electrical potential relationship with said reference electrode and sensitive to changes in conditions to be sensed for changing said electrical potential.

2. A biochemical sensor which comprises a container, electrodes disposed in said container, one of said electrodes being a reference electrode, another of said electrodes including an electrical conductor base and enzymes supported on said base, a potential indicator in circuit relation with said electrodes, said enzymes being effective to maintain an electrical potential relative to said reference electrode, a gas inlet for said container to flow a gas to be detected around the enzymes, and said enzymes being sensitive to impurities in the gas stream for changing the electrical potential whenever said impurities are present in the gas stream.

3. A sensor which comprises a container, a wick disposed in said container and projecting from the container, a bio-electrode contacting said wick including an electrical conductor base and a colony of bacteria thereon, a reference electrode disposed in said container in coupled relation with said bio-electrode, a potential indicator in said couple, a non-consumable electrode in said container, and means for coupling said non-consumable electrode with said bio-electrode, said colony of bacteria being sensitive to change in ambient conditions surrounding said wick to give a visual indication on said potential indicator whenever the ambient conditions include impurities to be sensed by the device.

4. A biochemical sensor which comprises a container, an aqueous brine solution in said container having a pH of from 5 to 9 and a sodium chloride concentration of from 1 to 5% by weight, a reference electrode immersed in said brine, a bio-electrode immersed in said brine coupled with said electrode, a potential indicator in said couple, means for introducing a gas to be sensed into said brine for enveloping said bio-electrode, said bio-electrode including an electrical conductor base, and a colony of biological organisms on said base selected from the group consisting of *Disulfovibrio desulfuricans* and *Chlorella pyrenoidosa*.

5. A sensing apparatus comprising an electrolyte, a reference electrode in said electrolyte, a secondary electrode in said electrolyte, a bio-electrode in said electrolyte, said bio-electrode containing enzymes capable of being denatured by exposure to the condition being sensed to give a measurable change of potential at said bio-electrode, means for establishing a polarizing current between said secondary electrode and said bio-electrode, and means for detecting changes in potential between said bio-electrode and said reference electrode.

6. The method of sensing a contaminant in an environment which comprises applying to an electrode a coating of a material selected from the group consisting of biological organisms and enzymes, said material being one which is at least partially denatured by the contaminant to be sensed, combining the resulting coated electrode into a cell containing an electrolyte and a reference electrode, exposing the coated electrode to said contaminant containing environment, and sensing the changes in potential between the coated electrode and said reference electrode as said material is progressively denatured by said contaminant.

7. The method of claim 6 in which said contaminant is a gas.

8. The method of sensing a contaminant in an environment which comprises applying to an electrode a coating of a material selected from the group consisting of biological organisms and enzymes, said material being one which is at least partially denatured by the contaminant to be sensed, combining the resulting electrode into a cell containing an electrolyte, a reference electrode, and a non-consumable electrode, applying a polarizing potential between the coated electrode and said non-consumable electrode, exposing the coated electrode to said contaminant containing environment, and sensing the changes in potential between the coated electrode and said reference electrode as said material is progressively denatured by said contaminant.

References Cited

UNITED STATES PATENTS

| | | | |
|---|---|---|---|
| 3,058,894 | 10/1962 | Hallum | 204—131 |
| 2,898,282 | 8/1959 | Flook et al. | 204—195 |
| 2,913,386 | 11/1959 | Clark | 204—195 |
| 3,022,241 | 2/1962 | Jessop | 204—195 |
| 3,058,894 | 10/1962 | Hallum | 204—131 |

OTHER REFERENCES

Frobesher: "Fundamentals of Microbiology," 1957, pp. 379–383.

"Journal of Bacteriology," vol. 21, January–June 1931, pp. 18 and 19.

Booth et al.: "Trans, of the Faraday Soc.," vol. 56, 1960, pp. 1689–1695.

Frazier et al.: "Journal of Bacteriology," vol. 21, January–June 1931, pp. 239–251.

"Business Week," May 6, 1961, p. 68.

Frobesher: "Fundamentals of Microbiology," 1957, pp. 378–384, 423 and 424.

"Science and Mechanics," August 1961, pp. 116 and 117.

HOWARD S. WILLIAMS, *Primary Examiner.*

T. TUNG, *Assistant Examiner.*